United States Patent Office 3,541,141
Patented Nov. 17, 1970

3,541,141
BIS-TRIIODOISOPHTHALAMIC
ACID COMPOUNDS
Jack Bernstein and Kathryn Alice Losee, New Brunswick,
N.J., assignors to E. R. Squibb & Sons, Inc., New York,
N.Y., a corporation of Delaware
No Drawing. Filed June 29, 1967, Ser. No. 649,831
Int. Cl. C07c *103/28, 103/46*
U.S. Cl. 260—518
11 Claims

ABSTRACT OF THE DISCLOSURE

This invention relates to new bis-triiodoisophthalamic acid compounds having the formula (I)
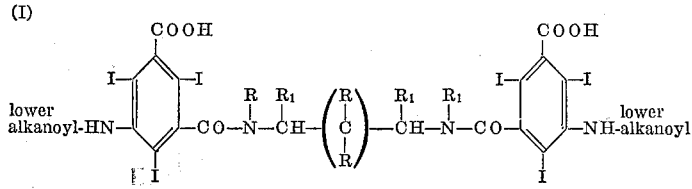

and to salts and lower alkyl esters of those compounds. These compounds are useful as radiopaque agents.

---

This invention relates to new compounds of Formula I above and to basic salts of those compounds, e.g., alkali metal salts such as sodium and amine salts such as N-methylglucamine, as well as lower alkyl esters of the new compounds of Formula I.

In Formula I, R represents hydrogen, lower alkyl or lower alkoxy, $n$ is an integer from 0 to 5 and $R_1$ represents hydrogen or lower alkyl.

The alkylene chain between the two rings may be straight or branched saturated hydrocarbon chains of 2 to 7 carbon atoms. There may be one to three lower alkoxy groups on that lower alkylene chain, but not on either carbon attached to the amide nitrogen. Such lower alkoxy groups as methoxy, ethoxy, propoxy, butoxy and the like are illustrative.

The lower alkanoyl radicals which are part of the amide groups in the 5-position of each ring are straight or branched acyl radicals of the lower fatty acids, e.g., acetyl, propionyl, butyryl and the like.

Preferred are those compounds of Formula I in which the bridging alkylene chain is an unsubstituted hydrocarbon chain of 2 to 3 carbon atoms, especially the former. The preferred lower alkanoyl group is acetyl.

The new compounds of Formula I are produced by forming an N,N'-alkylenebis(5-nitroisophthalamic acid) dialkyl ester ($R_2$=lower alkyl) of the formula (II)
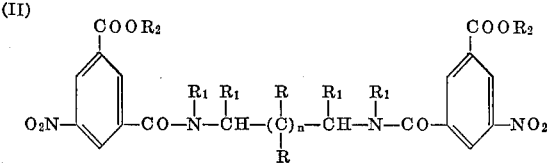

by the interaction of a 3-carboalkoxy-5-nitrobenzoyl halide (preferably the chloride) and an alkylene diamine such as ethylenediamine, trimethylene diamine, hexamethylenediamine, 2-methoxy-1,4-butanediamine, 1,2-propanediamine, etc. This reaction may be effected in an aqueous alkaline solution.

The ester of Formula II is then converted to the corresponding free acid ($R_2$=H) by treatment with alkali such as sodium carbonate. The two nitro groups are then reduced to amino groups, e.g., catalytically in the presence of a noble metal catalyst such as palladium, to obtain a compound of the formula (III)
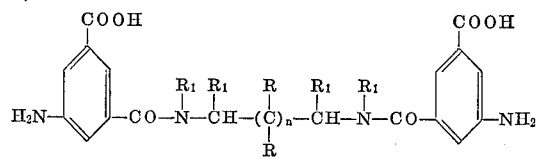

The compound of Formula III is then iodinated. This may be effected by treating the N,N'-alkylenebis(5-aminoisophthalamic acid) of Formula III with an iodinating agent, e.g., an iodine halide such as iodine chloride, in aqueous medium in the presence of potassium chloride. This gives a bis-(2,4,6-triiodoisophthalamic acid) of the formula (IV)
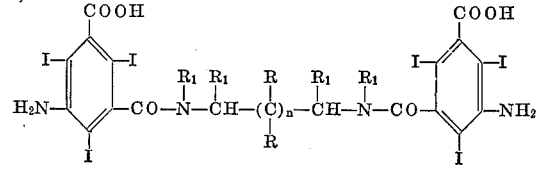

The product of Formula IV is then acylated with an acylating agent such as an acid anhydride or acyl halide, e.g., acetic anhydride, acetyl chloride, propionic anhydride, butyroyl chloride, hexanoyl chloride or the like to produce the final products of Formula I.

These products form salts with inorganic or organic bases, e.g., alkali or alkaline earth metal hydroxides such as sodium hydroxide or amines such as N-methylglucamine or may be converted to esters of lower alkanols, e.g., by treatment of an alkaline solution with a di(lower alkyl) sulfate. The salts, especially insoluble salts, frequently provide a convenient means for isolating and purifying the product.

The new products of Formula I are useful as radiopaque agents for visualization of animal systems or organs, preferably in the form of physiologically acceptable salts such as sodium or methylglucamine salts for the preparation of solutions for intravascular injection for urography and for vasographic techniques such as angiocardiography, arteriography, nephrography and venography. The water-insoluble esters are useful in visualizing hollow organs and cavities having external orifices through which the contrast preparation can be introduced in preparation for the examination and removal after the examination is completed. Solutions having about 20 to 50% bound iodine, preferably about 37%, may be used.

The following examples are illustrative of the invention. All temperatures are on the centigrade scale.

EXAMPLE 1

(a) Preparation of N,N'-ethylenebis(5-nitroisophthalamic acid) dimethyl ester

To a solution of 1.2 grams of ethylene diamine in 50 ml. of acetone there is added a solution of 3.36 grams of sodium bicarbonate in 50 ml. of water. The suspension is cooled to about 5 to 0° and 9.72 grams of 3-carbomethoxy-5-nitrobenzoyl chloride are added, in small portions, with vigorous stirring during thirty minutes. The reaction mixture is allowed to warm to room temperature and is then stirred for an additional four hours. The solid is filtered by suction and washed with water and alcohol to yield N,N'-ethylenebis-(5-nitroisophthalamic acid)dimethyl ester, melting at about 252–255° after crystallization from aqueous dimethylformamide.

(b) N,N'-ethylenebis(5-nitroisophthalamic acid)

To a suspension of 2.37 grams of N,N'-ethylenebis(5-nitroisophthalamic acid dimethyl ester in a mixture of 60 ml. of acetone and 60 ml. of water there are added 1.06 grams of sodium carbonate. The mixture is stirred at room temperature for one hour and then heated on a steam bath for 2½ hours. The clear solution is then concentrated under reduced pressure to remove the acetone and the aqueous solution is treated with decolorizing carbon. The solution is filtered and the filtrate is made strongly acid with 20% hydrochloric acid. The precipitated solid is filtered and washed with water to yield N,N'-ethylenebis(5-nitroisophthalamic acid). The acid, which does not melt below 300°, is crystallized from aqueous dimethylformamide.

(c) N,N'-ethylenebis(5-aminoisophthalamic acid)

To a solution of 4.46 grams of N,N'-ethylenebis(5-nitroisophthalamic acid) in 20 ml. of N-NaOH solution there are added 75 ml. of water and 500 mg. of 5% palladium on charcoal catalyst. The mixture is shaken at room temperature at 50 p.s.i. of hydrogen until the absorption of hydrogen is complete. The catalyst is removed by filtration and the aqueous solution acidified with acetic acid. The precipitated solid is filtered and washed with water to yield N,N'-ethylenebis(5-aminoisophthalamic acid) as a white solid which does not melt below 300°.

(d) N,N'-ethylenebis(5-amino-2,4,6-triiodoisophthalamic acid)

To a suspension of 7.72 grams of N,N'-ethylenebis-(5-aminoisophthalamic acid) in 100 ml. of water there is added, dropwise, during 30 minutes, a solution of 16 grams of ICl and 12.4 grams of KCl in 70 ml. of water. The mixture is stirred at room temperature for three hours and 40 ml. of N-NaOH solution and a solution of 8 grams of ICl and 6.2 grams of KCl in 40 ml. of water are added. The reaction mixture is stirred overnight. The solid is filtered and dissolved in 500 ml. of water and 45 ml. of N-NaOH solution. To this solution are added 20 grams of sodium bisulfite and the resulting solution is allowed to remain at room temperature overnight. The solution is treated with decolorizing carbon, filtered and acidified. The precipitated solid is filtered and washed thoroughly with water to yield N,N'-ethylenebis(5-amino-2,4,6-triiodoisophthalamic acid) which does not melt below 300°.

(e) N,N'-ethylenebis(5-acetamido-2,4,6-triiodoisophthalamic acid)

A mixture of 5.5 grams of N,N'-ethylenebis(5-amino-2,4,6-triiodoisophthalamic acid) and 100 ml. of acetic anhydride containing 2 drops of concentrated sulfuric acid is refluxed with stirring for about two hours. The cooled reaction mixture is filtered, concentrated under reduced pressure to remove the excess acetic anhydride and poured into ice water. The precipitated solid is filtered and washed thoroughly with water. The solid is dissolved in ethanol, treated with decolorizing carbon, filtered and the filtrate concentrated to dryness. The N,N'-ethylenebis-(5-acetamide-2,4,6-triiodoisophthalamic acid) thus obtained does not melt below 300°.

EXAMPLE 2

Following the procedure of Example 1, but substituting an equivalent amount of N,N'-dimethylethylenediamine for the ethylenediamine there is obtained the desired N,N'-dimethyl-N,N'-ethylenebis(5-acetamide-2,4,6 - triiodoisophthalamic acid).

EXAMPLE 3

Following the procedure of Example 1, but substituting an equivalent amount of 1,2-propanediamine for the ethylene diamine there is obtained the desired N,N'-1,2-propylenebis(5-acetamido-2,4,6-triiodoisophthalamic acid).

EXAMPLE 4

Following the procedure of Example 1, but substituting an equivalent amount of butyric anhydride for the acetic anhydride there is obtained the desired N,N'-ethylenebis-(5-butyramido-2,4,6-triiodoisophthalamic acid).

EXAMPLE 5

Following the procedure of Example 1, but substituting an equivalent amount of 2,3-dimethoxy-1,4-butanediamine for the ethylenediamine there is obtained the desired N,N'-(2,3-dimethoxytetramethylene)bis(5-acetamido - 2,4,6-triiodoisophthalamic acid).

EXAMPLE 6

Following the procedure of Example 1, but substituting an equivalent amount of 2-methoxy-1,4-butanediamine for the ethylenediamine there is obtained the desired N,N'-(2-methoxytetramethylene)bis(5-acetamido-2,4,6 - triiodoisophthalamic acid).

EXAMPLE 7

Following the procedure of Example 1, but substituting an equivalent amount of 3-methoxy-1,6-hexanediamine for the ethylenediamine, there is obtained the desired N,N'-(3-methoxyhexamethylene)bis(acetamido-2,4,6 - triiodoisophthalamic acid).

EXAMPLE 8

Following the procedure of Example 1, but substituting an equivalent amount of 2,2-dimethyl-1,3-propanediamine for the ethylenediamine there is obtained the desired N,N'-(2,2-dimethyltrimethylene)bis(5 - acetamido - 2,4,6-triiodoisophthalamic acid).

EXAMPLE 9

Following the procedure of Example 1, but substituting an equivalent amount of N,N'-isopropyl-1,6-hexanediamine for the ethylenediamine there is obtained the desired N,N'-diisopropyl-N,N' - hexamethylenebis(5 - acetamido-2,4,6-triiodoisophthalamic acid).

EXAMPLE 10

Following the procedure of Example 1, but substituting an equivalent amount of 3-isobutoxy-1,6-hexanediamine for the ethylenediamine there is obtained the desired N,N' - (3 - isobutoxy - hexamethylene)bis(5 - acetamido-2,4,6-triiodoisophthalamic acid).

EXAMPLE 11

A solution of 6.6 grams of potassium hydroxide in 200 ml. of ethanol is added to a suspension of 61 grams of N,N' - ethylenebis(5 - acetamido - 2,4,6 - triiodoisophthalamic acid) in 500 ml. of ethanol. To this mixture there is then added slowly, with vigorous stirring 12.6 grams of dimethyl sulfate and the mixture stirred for six hours. The reaction mixture is diluted with 1 liter of water and the solid removed by filtration. The dimethyl ester of N,N'-ethylenebis(5-acetamido - 2,4,6 - triiodoisophthalamic acid) thus obtained is further purified by dissolving the solid in hot dimethylformamide, filtering and diluting the filtrate with water. The product is collected by filtration and washed thoroughly with water.

EXAMPLE 12

Following the procedure of Example 11, but substituting an equivalent amount of diethyl sulfate for the dimethyl sulfate there is obtained the desired diethyl diester of N,N'-ethylenebis(5-acetamido - 2,4,6 - triiodo-isophthalamic acid).

EXAMPLE 13

To a stirred mixture of 28.5 grams of N,N'-ethylenebis-(5-amino-2,4,6-triiodoisophthalamic acid) in 500 ml. of dimethylacetamide there is added 25 grams of n-hexanoyl chloride and the mixture heated with stirring at 100° for four hours and then poured into water and allowed to stir at room temperature for twenty-four hours. The precipitated solid is dissolved in dilute sodium hydroxide, treated with decolorizing carbon and then acidified with dilute hydrochloric acid. The N,N'-ethylenebis(5-n-hexanoylamido-2,4,6 - triiodoisophthalamic acid) is filtered and washed thoroughly with water.

EXAMPLE 14

To a suspension of 122.6 grams of N,N'-ethylenebis(5-acetamido-2,4,6-triiodoisophthalamic acid) in 1 liter of water there is added 200 ml. of N-sodium hydroxide solution and the resulting solution lyophilized to yield the desired disodium salt of N,N'-ethylenebis(5-acetamido-2,4,6-triiodoisophthalamic acid).

Similarly, by using an equivalent amount of N-methylglucamine there is obtained the desired N-methylglucamine salt of N,N'-ethylenebis(5-acetamido-2,4,6-triiodoisophthalamic acid).

EXAMPLE 15

A solution suitable for use in intravenous urography has the following composition (per 100 ml.):

N,N'-ethylenebis(5-acetamido-2,4,6-triiodoisophthalamic acid, sodium salt—63.5 grams
Sodium citrate (as buffer)—320 mg.
Disodium ethylenediamine tetraacetic acid dihydrate (sequestering agent)—40 mg.
Methyl paraben (as preservative)—100 mg.
Propyl paraben (as preservative)—30 mg.

The solution is prepared by dissolving the sodium salt in a limited amount of sterile water, adjusting the pH to about 7, adding the rest of the components and adjusting the final volume to 100 ml.

What is claimed is:
1. A compound of the formula

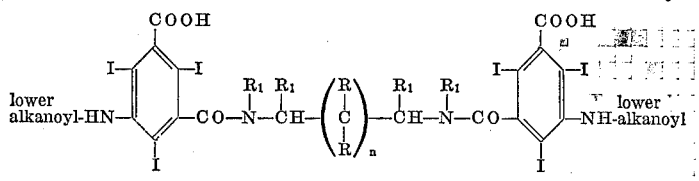

wherein R is hydrogen, lower alkyl or lower alkoxy,
$R_1$ is hydrogen or lower alkyl and $n$ is 0 to 5, and lower alkyl esters and physiologically acceptable salts thereof.

2. A compound as in claim 1 wherein each R and $R_1$ is hydrogen and $n$ is 0.

3. A compound as in claim 2 wherein the lower alkanoyl group is acetyl.

4. A compound as in claim 1 wherein the $R_1$ on each nitrogen is lower alkyl and each other $R_1$ and R are hydrogen, and $n$ is 0.

5. A compound as in claim 4 wherein the lower alkyl group is methyl and the lower alkanoyl group is acetyl.

6. A compound as in claim 1 wherein each R and each $R_1$ on the nitrogen is hydrogen, each $R_1$ on the carbon is lower alkyl and $n$ is 1.

7. A compound as in claim 6 wherein the lower alkyl group is methyl.

8. A compound as in claim 1 wherein each R and $R_1$ is hydrogen, $n$ is 1 and each lower alkanoyl group is acetyl.

9. A compound of the formula

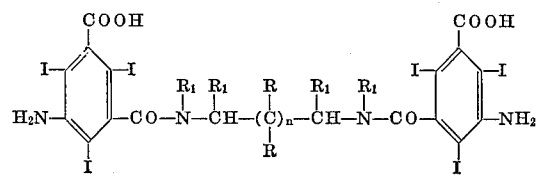

wherein R, $R_1$ and $n$ have the same meaning as in claim 1.

10. A compound as in claim 9 wherein each R and $R_1$ is hydrogen and $n$ is 0.

11. A compound as in claim 9 wherein each R and $R_1$ is hydrogen and $n$ is 1.

References Cited

UNITED STATES PATENTS

| | | | |
|---|---|---|---|
| 3,178,473 | 4/1965 | Holtermann et al. | 260—519 |
| 3,306,927 | 2/1967 | Larsen | 260—518 |
| 3,409,662 | 11/1968 | Larsen | 260—518 |

LORRAINE A. WEINBERGER, Primary Examiner

L. A. THAXTON, Assistant Examiner

U.S. Cl. X.R.

260—471, 501.11, 519; 424—5